US012785519B2

(12) United States Patent
Shima et al.

(10) Patent No.: US 12,785,519 B2
(45) Date of Patent: Nov. 3, 2026

(54) INVERTER-INTEGRATED ELECTRIC COMPRESSOR

(71) Applicant: SANDEN CORPORATION, Isesaki (JP)

(72) Inventors: Toshimasa Shima, Isesaki (JP); Kazuya Matsuzaki, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 157 days.

(21) Appl. No.: 18/855,219

(22) PCT Filed: Mar. 21, 2023

(86) PCT No.: PCT/JP2023/011050
§ 371 (c)(1),
(2) Date: Oct. 8, 2024

(87) PCT Pub. No.: WO2023/203951
PCT Pub. Date: Oct. 26, 2023

(65) Prior Publication Data

US 2026/0189109 A1 Jul. 2, 2026

(30) Foreign Application Priority Data

Apr. 22, 2022 (JP) ................................ 2022-070485

(51) Int. Cl.
*H02K 11/33* (2016.01)
*F04C 18/02* (2006.01)
(Continued)

(52) U.S. Cl.
CPC .......... *H02K 11/33* (2016.01); *F04C 18/0207* (2013.01); *H02K 5/225* (2013.01); *H02K 7/14* (2013.01); *F04C 2240/403* (2013.01)

(58) Field of Classification Search
CPC .......... H02K 11/33; H02K 5/225; H02K 7/14; F04C 18/0207; F04C 2240/403
(Continued)

(56) References Cited

U.S. PATENT DOCUMENTS 12,549,057 B2 * 2/2026 Gecgel .................... H02K 5/10
2011/0243769 A1 * 10/2011 Yamada ................ H02K 5/225 417/410.1
(Continued)

FOREIGN PATENT DOCUMENTS

JP 2003-214340 A 7/2003
JP 2015-183668 A 10/2015
(Continued)

OTHER PUBLICATIONS

JP 2003214340; Kenji et al. (Year: 2003).*
WO 2015146677; Kobayashi et al. (Year: 2015).*
Office Action dated Dec. 16, 2025, issued in JP 70485/2022.

*Primary Examiner* — Ahmed Elnakib
(74) *Attorney, Agent, or Firm* — COZEN O'CONNOR

(57) ABSTRACT

To provide an inverter-integrated electric compressor capable of preventing cracking of a hermetic plate and achieving reductions in size and weight.

An inverter-integrated electric compressor 1 includes a motor chamber 12 in which an electric motor 2 is built, an inverter accommodation part 13 to which an inverter 3 supplying power to the electric motor 2 is attached, and a hermetic plate 52 provided on a partition wall 7A between the motor chamber 12 and the inverter accommodation part 13. A hermetic pin 53 of the hermetic plate 52 and a circuit board 51 of the inverter 3 are connected via a connection terminal 54. A through hole 56 is provided which is formed in the circuit board 51 and into which the connection terminal 54 and the hermetic pin 53 enter.

3 Claims, 10 Drawing Sheets

(51) Int. Cl.
*H02K 5/22* (2006.01)
*H02K 7/14* (2006.01)

(58) Field of Classification Search
USPC .......................................................... 310/68 D
See application file for complete search history.

(56) References Cited

U.S. PATENT DOCUMENTS

2014/0375157 A1* 12/2014 Taguchi .................... H02K 3/44
310/71
2022/0181941 A1* 6/2022 Seok .................... B60H 1/3222

FOREIGN PATENT DOCUMENTS

JP 2016-140186 A 8/2016
JP 6303957 B2 4/2018
JP 2021-136731 A 9/2021

* cited by examiner

INVERTER-INTEGRATED ELECTRIC COMPRESSOR

RELATED APPLICATIONS

This is a U.S. National Phase Application under 35 USC 371 of International Application PCT/JP2023/011050 filed on Mar. 21, 2023.

This application claims the priority of Japanese application no. 2022-070485 filed Apr. 22, 2022, the entire content of which is hereby incorporated by reference.

FIELD OF THE INVENTION

The present invention relates to an inverter-integrated electric compressor in which an inverter is attached to an inverter accommodation part.

BACKGROUND ART

Heretofore, as an electric compressor to be used in a vehicular air conditioner, an inverter-integrated electric compressor in which an inverter is attached to an inverter accommodation part formed in a housing in consideration of switching noise has been used (for example, see Patent Document 1). In this case, a motor is accommodated in a motor chamber of the housing, and a hermetic plate made of glass is provided on a partition wall between the motor chamber and the inverter accommodation part. Each hermetic pin of the hermetic plate and a circuit board of the inverter are configured to be connected by a connection terminal.

CITATION LIST

Patent Document

Patent Document 1: Japanese Patent No. 6303957

SUMMARY OF THE INVENTION

Problems to be Solved by the Invention

However, the conventional structure was accompanied by a problem in that due to variations in the position of the connection terminal, a load was applied to the hermetic pin during assembly to connect the hermetic pin and the connection terminal, thereby resulting in breaking of the hermetic plate made of glass.

Further, conventionally, since the connection terminal was attached to the hermetic plate via resin parts, the height of the circuit board from the partition wall became higher, and the height dimension of the inverter accommodation part was expanded, thereby resulting in an increase in the size and weight of the housing.

The present invention has been made in order to solve the conventional technical problems. It is an object of the present invention to provide an inverter-integrated electric compressor capable of preventing cracking of a hermetic plate and achieving reductions in size and weight.

Means for Solving the Problems

An inverter-integrated electric compressor of the present invention includes a motor chamber in which a motor is built, an inverter accommodation part to which an inverter supplying power to the motor is attached, and a hermetic plate provided on a partition wall between the motor chamber and the inverter accommodation part, in which a hermetic pin of the hermetic plate and a circuit board of the inverter are connected via a connection terminal, and in which a through hole formed in the circuit board and into which the connection terminal and the hermetic pin enter is provided.

In the inverter-integrated electric compressor of the invention of Item 2, the connection terminal is held on the circuit board in a state in which the connection terminal enters the through hole, and in that state, the connection terminal is movable in a planar direction of the circuit board in the invention described above.

In the inverter-integrated electric compressor of the invention of Item 3, the connection terminal has a board connection pin for connecting to the circuit board and a fitting portion for connecting to the hermetic pin, the fitting portion has a shape which allows a change in the position of the connection terminal with respect to the hermetic pin, the circuit board is formed with an insertion hole into which the board connection pin is inserted, and the insertion hole is provided with a power basket to which the board connection pin is connected in the invention described above.

In the inverter-integrated electric compressor of the invention of Item 4, a plurality of the hermetic pins and the power baskets are provided corresponding to each phase of the motor, the connection terminal is connected to each of the hermetic pins, and in a state in which the board connection pins of the connection terminals are connected to the power baskets respectively, an interval between the board connection pins becomes larger than an interval between the hermetic pins in the invention described above.

In the inverter-integrated electric compressor of the invention of Item 5, the fitting portion of the connection terminal is fittable to the hermetic pin in a state in which the connection terminal is held in the through hole of the circuit board, and the board connection pin is connected to the power basket in the invention of Items 3 or 4.

Advantageous Effect of the Invention

According to the present invention, in the inverter-integrated electric compressor which includes the motor chamber in which the motor is built, the inverter accommodation part to which the inverter supplying power to the motor is attached, and the hermetic plate provided on the partition wall between the motor chamber and the inverter accommodation part, and in which the hermetic pin of the hermetic plate and the circuit board of the inverter are connected via the connection terminal, the through hole formed in the circuit board and into which the connection terminal and the hermetic pin enter is provided, whereby interference in the height direction between the circuit board and the hermetic pin and connection terminal is avoided.

Thus, it is possible to reduce the height of the circuit board from the partition wall, and achieve reductions in the size and weight of the electric compressor by reducing the height dimension of the inverter accommodation part.

In addition, it is possible to avoid cracking of the hermetic plate due to variations during assembly, and it is possible to use the hermetic plate in common between different types of devices, whereby it is also possible to achieve reductions in cost and development time.

Further, it is possible to omit the parts holding the connection terminal by holding the connection terminal on the circuit board while entering the through hole as in the invention of Item 2, whereby the number of parts can be reduced. Moreover, by making the connection terminal movable in the planar direction of the circuit board while being held on the circuit board, it is possible to absorb variations in the position of the connection terminal relative to the hermetic pin during assembly, and to realize smooth assembly by an automatic machine.

In addition, as in the invention of Item 3, the connection terminal is provided with the board connection pin for connecting to the circuit board and the fitting portion for connecting to the hermetic pin, the fitting portion has the shape which allows the change in the position of the connection terminal with respect to the hermetic pin, the circuit board is formed with the insertion hole into which the board connection pin is inserted, and the insertion hole is provided with the power basket to which the board connection pin is connected, whereby it is possible to absorb variations in the position of the connection terminal with respect to the hermetic pin during assembly in a further excellent manner, and to realize a stable electrical connection between the hermetic pin and the circuit board by the connection terminal even by assembly by the automatic machine.

Furthermore, since the connection terminal is made movable in the planar direction of the circuit board as in the invention of Item 2, for example, even when the position of the power basket on the circuit board differs depending on the model, the displacement of the position can be absorbed by the movement of the connection terminal, whereby it becomes possible to use the hermetic plate in common between different models.

In this case, as in the invention of Item 4, a plurality of the hermetic pins and the power baskets are provided corresponding to each phase of the motor, and the connection terminal is connected to each of the hermetic pins. However, in the state in which the board connection pins of the connection terminals are connected to the power baskets respectively, the interval between the board connection pins is set to be larger than the interval between the hermetic pins, whereby it is possible to ensure the insulation distance between the connection terminals on the circuit board side and to handle even an ultra-high voltage.

Moreover, as in the invention of Item 5, the fitting portion of the connection terminal is made fittable to the hermetic pin while the connection terminal is held in the through hole of the circuit board and the board connection pin is connected to the power basket, whereby it is possible to reduce the number of personnel by assembling with the automatic machine.

DETAILED DESCRIPTION OF THE DRAWINGS

Figure 1:
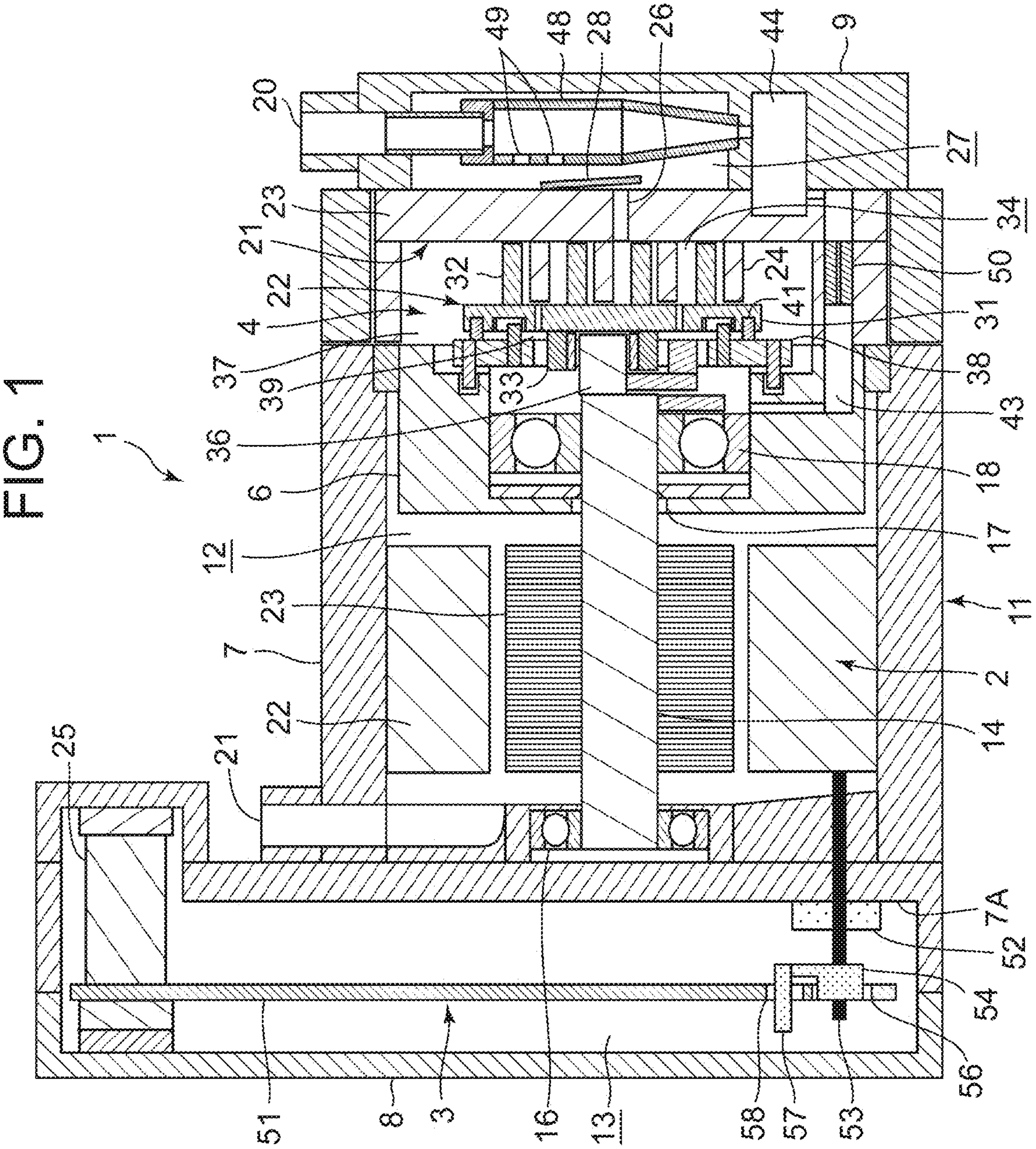
FIG. 1 is a schematic cross-sectional view of an inverter-integrated electric compressor according to an embodiment to which the present invention is applied.
Figure 2:
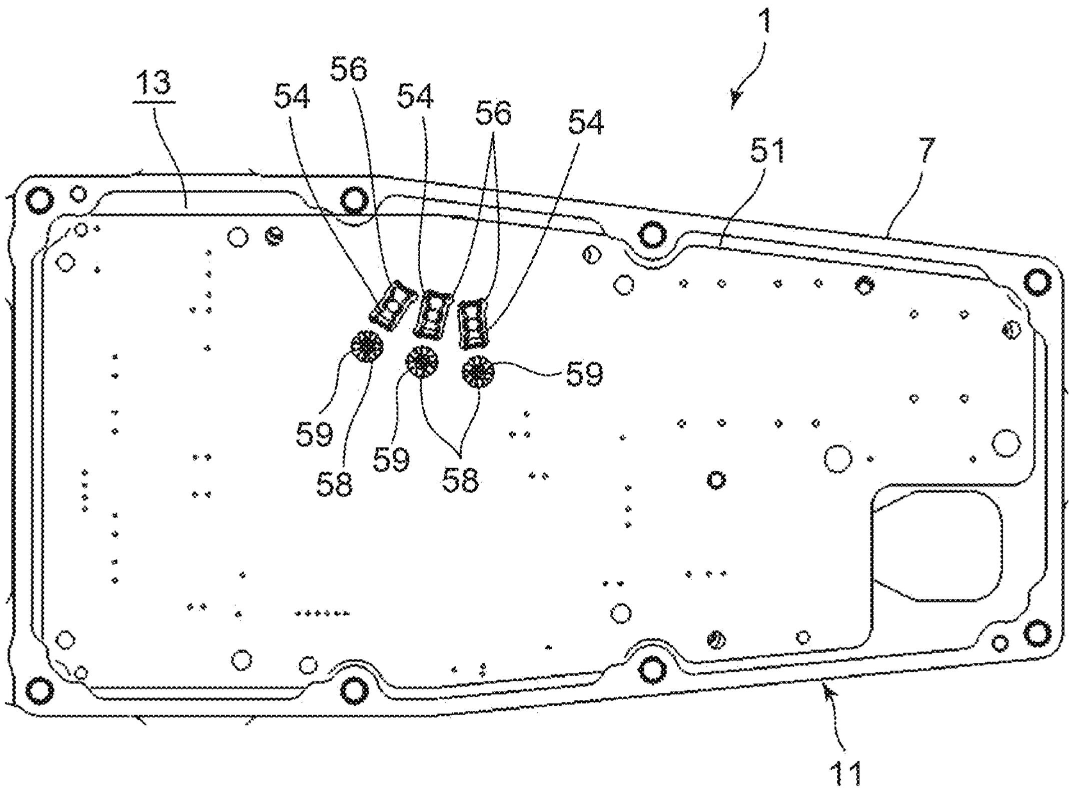
FIG. 2 is a plan view of the electric compressor of FIG. 1 as viewed from the side of an inverter accommodation part excluding a cover.

Hereinafter, embodiments of the present invention will be described in detail with reference to the drawings. FIG. 1 is a schematic cross-sectional view of an inverter-integrated electric compressor 1 according to an embodiment to which the present invention is applied, and FIG. 2 is a plan view of the electric compressor 1 as viewed from the inverter accommodation part 13 side excluding a cover 8.

The inverter-integrated electric compressor 1 according to the embodiment is used in, for example, a refrigerant circuit of an air conditioner for a vehicle, and sucks in a refrigerant as a working fluid of the air conditioner, compresses it, and discharges it to a discharge pipe. The inverter-integrated electric compressor 1 is a so-called horizontal inverter-integrated scroll compressor including a three-phase electric motor 2 as a motor in the present invention, an inverter 3 for driving the electric motor 2, and a scroll compression mechanism 4 as a compression mechanism driven by the electric motor 2.

The electric compressor 1 of the embodiment includes a stator housing 7 which houses the electric motor 2, the inverter 3, and a center casing 6 thereinside, a cover 8, and a rear casing 9. These stator housing 7, cover 8, and rear casing 9 are all made of metal (made of aluminum in the embodiment). They are integrally joined to form a housing 11 of the electric compressor 1.

The stator housing 7 is provided with a partition wall 7A on one end side thereof. The partition wall 7A partitions the interior of the stator housing 7 (constituting a part of the housing 11) into a motor chamber 12 which accommodates the electric motor 2 and the inverter accommodation part 13 which accommodates the inverter 3. The inverter accommodation part 13 is open at one end face, and after the inverter 3 is accommodated, this opening is closed by the cover 8 fixed to the stator housing 7 (constituting a part of the housing 11). The motor chamber 12 is also open at the other end face, and after the electric motor 2 is accommodated, the center casing 6 is accommodated in this opening. Further, a sub-bearing 16 for rotatably supporting one end (front side) of a drive shaft 14 of the electric motor 2 is attached to the motor chamber 12 side of the partition wall 7A.

The center casing 6 is open on the opposite side (the other end side) to the electric motor 2. After a movable scroll 22 to be described later of the scroll compression mechanism 4 is accommodated in this opening, this opening is closed by fixing the rear casing 9 to which a fixed scroll 21 to be described later of the scroll compression mechanism 4 is fixed, to the stator housing 7.

Further, a through hole 17 through which the other end of the drive shaft 14 of the electric motor 2 is inserted is opened in the center casing 6. A main bearing 18 which rotatably supports the other end of the drive shaft 14 on the scroll compression mechanism 4 side is installed in the center casing 6 on the scroll compression mechanism 4 side of the through hole 17.

The electric motor 2 is constituted of a stator 22 having a coil wound thereon and fixed to the inner side of a circumferential wall of the stator housing 7, and a rotor 23 rotated inside the stator 22. Then, for example, a DC current from a vehicle battery (not illustrated) is converted into a three-phase AC current by the inverter 3, which is then supplied to the coil of the stator 22 of the electric motor 2, so that the rotor 23 is configured to be rotatably driven. Then, the drive shaft 14 is fixed to the rotor 23.

Further, the stator housing 7 is formed with a suction port 21. The refrigerant sucked from the suction port 21 passes through the electric motor 2 in the stator housing 7, after which the refrigerant flows into the center casing 6 and is sucked into a suction part 37 outside the scroll compression mechanism 4. Thus, the electric motor 2 is cooled by the sucked refrigerant. Further, the refrigerant compressed by the scroll compression mechanism 4 is made to be discharged from a discharge chamber 27 to be described later to a discharge pipe of an unillustrated refrigerant circuit outside the housing 11 through a discharge port 20 formed in the rear casing 9.

The scroll compression mechanism 4 is constituted of the fixed scroll 21 and movable scroll 22 described above. The fixed scroll 21 integrally includes a disk-shaped end plate 23 and a spiral lap 24 formed of an involute shape or a curved line approximating the involute shape, which is set upright on the surface (one side) of the end plate 23. The fixed scroll 21 is fixed to the rear casing 9 with the surface of the end plate 23 on which the lap 24 is set upright as the center casing 6 side. A discharge hole 26 is formed in the center of the end plate 23 of the fixed scroll 21. This discharge hole 26 is in communication with a discharge chamber 27 in the rear casing 9. In the figure, reference numeral 28 indicates a discharge valve provided at an opening of the discharge hole 26 on the back surface (other surface) side of the end plate 23.

The movable scroll 22 is a scroll which revolves around the fixed scroll 21, and integrally includes a disk-shaped end plate 31, a spiral lap 32 constituted of an involute shape or a curve approximating it, which is provided upright on the surface (one side) of the end plate 31, and a boss 33 formed protrudingly at the center of the back surface (other surface) of the end plate 31. The movable scroll 22 is arranged so that the lap 32 faces the lap 24 of the fixed scroll 21 with the protruding direction of the lap 32 as the fixed scroll 21 side, and both laps mesh with each other facing each other, thereby forming a pressure chamber 34 between the laps 24 and 32.

That is, the lap 32 of the movable scroll 22 faces the lap 24 of the fixed scroll 21, and is engaged with the lap 24 so that the tip of the lap 32 is in contact with the surface of the end plate 23 and the tip of the lap 24 is in contact with the surface of the end plate 31. Further, the boss 33 of the movable scroll 22 is fitted with an eccentric portion 36 provided eccentrically from the shaft center at the other end of the drive shaft 14. Then, when the drive shaft 14 is rotated together with the rotor 23 of the electric motor 2, the movable scroll 22 is configured to revolve in relation to the fixed scroll 21 without rotating.

Since the movable scroll 22 revolves eccentrically with respect to the fixed scroll 21, the eccentric direction and contact position of each of the laps 24 and 32 move while rotating. The pressure chamber 34 having sucked the refrigerant from the above-described outer suction part 37 gradually shrinks as it moves inward. Consequently, the refrigerant is compressed and finally discharged from the central discharge hole 26 into the discharge chamber 27 via the discharge valve 28.

In FIG. 1, reference numeral 38 indicates an annular thrust plate. The thrust plate 38 is for partitioning a back pressure chamber 39 formed between the back surface of the end plate 31 of the movable scroll 22 and the center casing 6, and the suction part 37 outside the scroll compression mechanism 4. The thrust plate 38 is located outside the boss 33 and interposed between the center casing 6 and the movable scroll 22. Further, reference numeral 41 indicates a seal material which is attached to the back surface of the end plate 31 of the movable scroll 22 and makes contact with the thrust plate 38. The back pressure chamber 39 and the suction part 37 are partitioned by the seal material 41 and the thrust plate 38.

Further, reference numeral 48 indicates a centrifugal oil separator installed in the discharge chamber 27 of the rear casing 9 (housing 11). The oil separator 48 separates lubricating oil mixed into the refrigerant discharged from the scroll compression mechanism 4 to the discharge chamber 27 from the refrigerant. An inflow port 49 is formed in the oil separator 48. The refrigerant containing oil which flows in from the inflow port 49 swirls within the oil separator 48. The oil is separated by a centrifugal force at this time, and the refrigerant moves from an outflow port at the upper end of the oil separator to the discharge port 20, and is discharged into the discharge pipe as described above.

An oil storage chamber 44 is formed in the rear casing 9 below the oil separator 48. The oil separated from the refrigerant by the oil separator 48 flows into the oil storage chamber 44 from a lower end of the oil separator 48. In the figure, reference numeral 43 indicates a back pressure passage formed from the rear casing 9 to the center casing 6. The back pressure passage 43 is a passage which communicates the oil separator 48 in the discharge chamber 27 (on the discharge side of the scroll compression mechanism 4) in the rear casing 9 with the back pressure chamber 39, and has an orifice 50 in the embodiment. Thus, it is configured in such a way that the discharge pressure adjusted to be reduced by the orifice 50 of the back pressure passage 43 is supplied to the back pressure chamber 39 together with the oil in the oil storage chamber 44 separated by the oil separator 48.

The pressure (back pressure) in the back pressure chamber 39 causes a back pressure load which presses the movable scroll 22 against the fixed scroll 21. Due to the back pressure load, the movable scroll 22 is pressed against the fixed scroll 21 against a compression reaction force from the pressure chamber 34 of the scroll compression mechanism 4, so that the contact between the laps 24 and 32 and the end plates 31 and 23 is maintained, thereby enabling the refrigerant to be compressed in the pressure chamber 34.

Next, a description will be made about a structure around the inverter 3 of the inverter-integrated electric compressor 1 of the embodiment with further reference to FIGS. 2 to 12. The inverter 3 in the embodiment has a control circuit, a power switching element, and a smoothing capacitor 25 mounted on a single circuit board 51. In this case, a glass-made hermetic plate 52 is attached to the inverter accommodation part 13 side of the partition wall 7A at a position corresponding to one end side of the circuit board 51. A conductive hermetic pin 53 is attached to the hermetic plate 52. In this case, the three hermetic pins 53 are attached corresponding to each phase of the electric motor 2.

One end side of each hermetic pin 53 stands up from the partition wall 7A in the inverter accommodation part 13, and the other end side thereof penetrates through the partition wall 7A and enters the motor chamber 12, and is connected to the coil of the stator 22 of the electric motor 2. Connection terminals (three) 54 are each connected to one end side of each hermetic pin 53, and each connection terminal 54 is connected to the circuit board 51, so that the hermetic pin 53 is structured to be electrically connected to the circuit board 51.

In this case, three approximately rectangular through holes 56 into which the connection terminals 54 and the hermetic pins 53 respectively enter as described later, formed in the circuit board 51. Further, three insertion holes 58 into which board connection pins 57 of the connection terminals 54 to be described later are respectively inserted are formed in the circuit board 51 at positions spaced a predetermined distance apart in the longitudinal direction of each through hole 56. Also, as illustrated in FIG. 2, the interval between the insertion holes 58 is formed to be larger than the interval between the ends of the through holes 56 on the opposite side to the insertion hole 58. Further, although omitted in FIG. 1, metal-made power baskets 59 are attached to the insertion holes 58 respectively.

Next, a description will be made of a structure of the connection terminal 54 in the embodiment with reference to FIGS. 5 to 8. The connection terminal 54 is made of a conductive metal plate, and includes a pair of side walls 61 and 62 facing each other with a predetermined interval, and connecting walls 63 and 64 connecting one end side and an intermediate portion of each of the side walls 61 and 62 in its longitudinal direction. Each of the walls 61 to 64 forms a rectangular shape which is open in the vertical direction when viewed from above. An extending portion 66 is formed to extend further toward the other end in the longitudinal direction from the intermediate portion of each of the side walls 61 and 62. The above-described board connection pin 57 is formed standing at a tip portion of the extending portion 66.

Arcuate portions 61A and 62A each of which bulges outward to form an elliptical arc shape long in the longitudinal direction of the connection terminal 54 are bent and formed on the side walls 61 and 62. The arcuate portions 61A and 62A form a fitting portion 67. Further, engagement claws 68 and 69 which protrude outward are formed at upper end portions of the connecting walls 63 and 64, respectively. In addition, the width of the connection terminal 54 in the lateral direction is set to be smaller than the width of the through hole 56 of the circuit board 51 in the lateral direction.

With the above configuration, a procedure for assembling the circuit board 51 to the inverter accommodation part 13 of the housing 11 (stator housing 7) will be described. First, with the back surface side of the circuit board 51 (the surface which becomes each wall 7A side when assembled) facing upward, the three connection terminals 54 are respectively attached to the through holes 56 from above as illustrated by arrows in FIG. 9 with the board connection pins 57 face downward (the circuit board 51 side). At this time, the board connection pin 57 of each connection terminal 54 is inserted into each insertion hole 58 from the back surface side of the circuit board 51, and press-fitted into and connected to the power basket 59.

Figure 3:
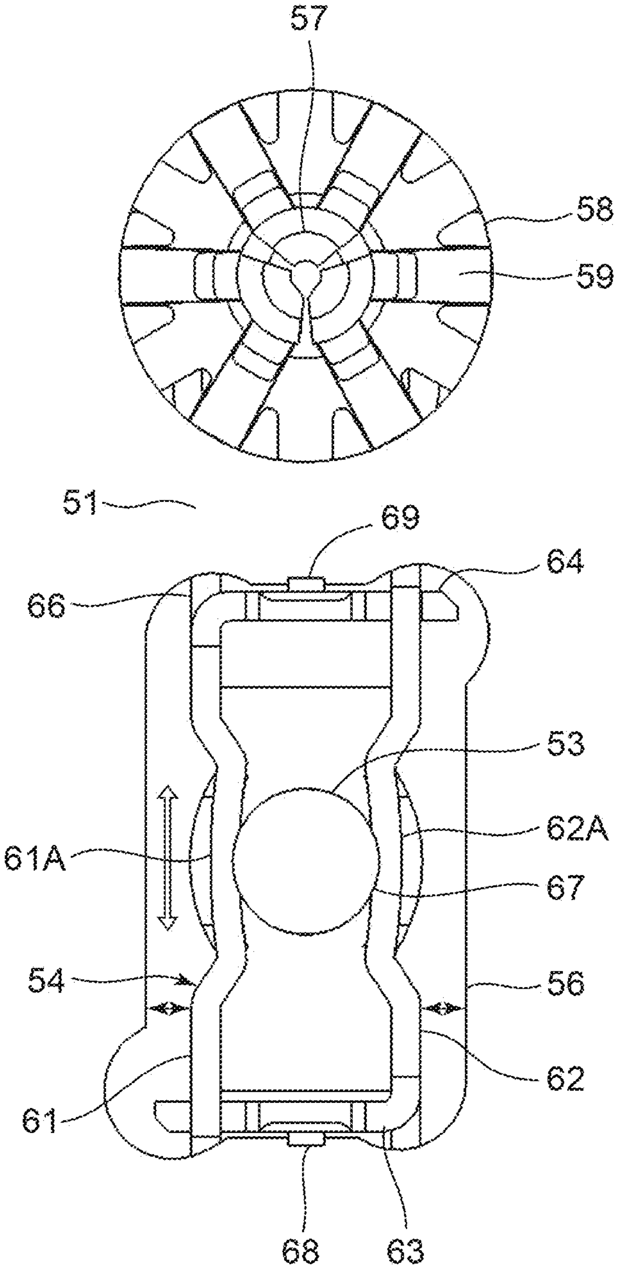
FIG. 3 is an enlarged plan view of a connection terminal portion of a circuit board in the electric compressor of FIG. 1.
Figure 4:
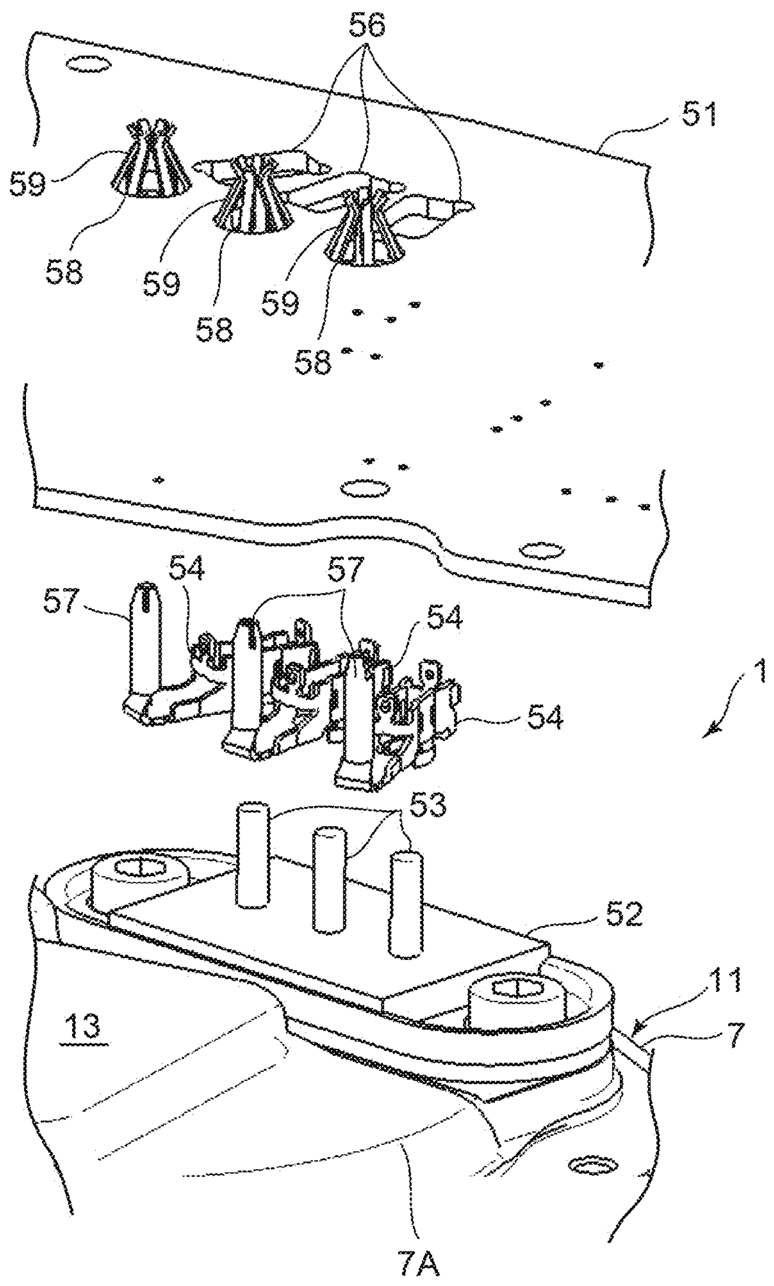
FIG. 4 is an enlarged exploded perspective view of a hermetic plate and a circuit board portion in the electric compressor of FIG. 1.
Figure 5:
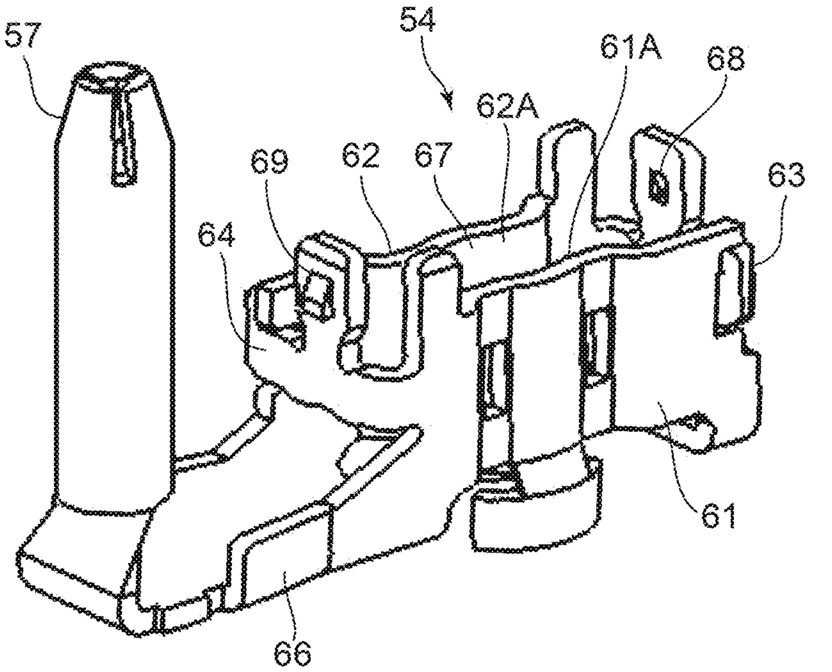
FIG. 5 is a perspective view of a connection terminal of the electric compressor of FIG. 1.
Figure 6:
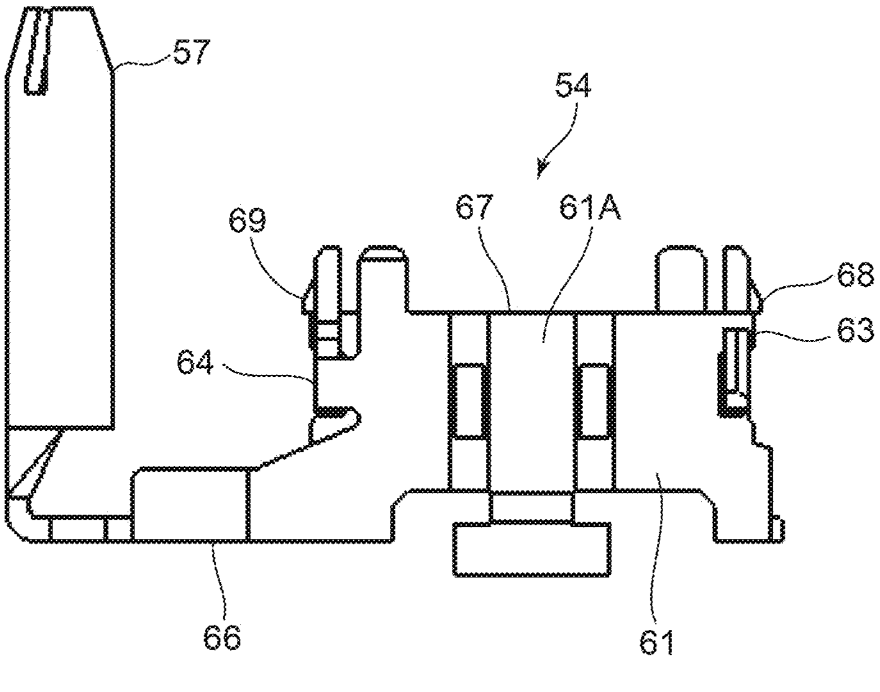
FIG. 6 is a side view of the connection terminal of FIG. 5.
Figure 7:
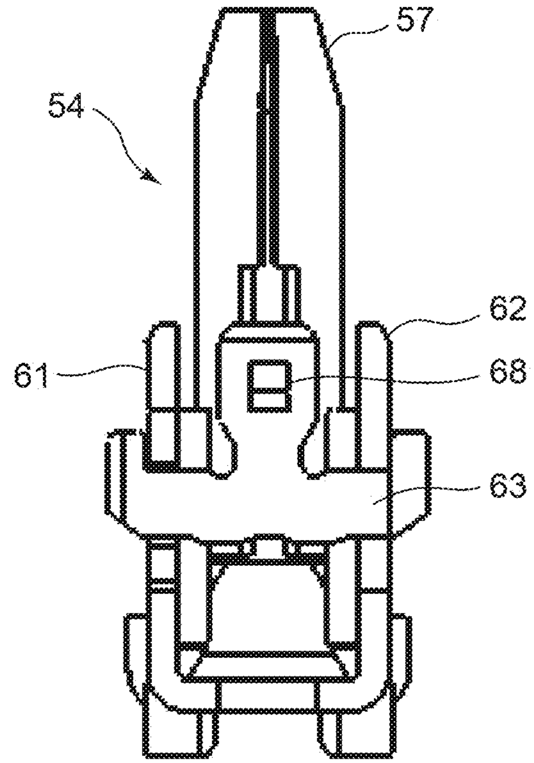
FIG. 7 is a back view of the connection terminal of FIG. 5.
Figure 8:
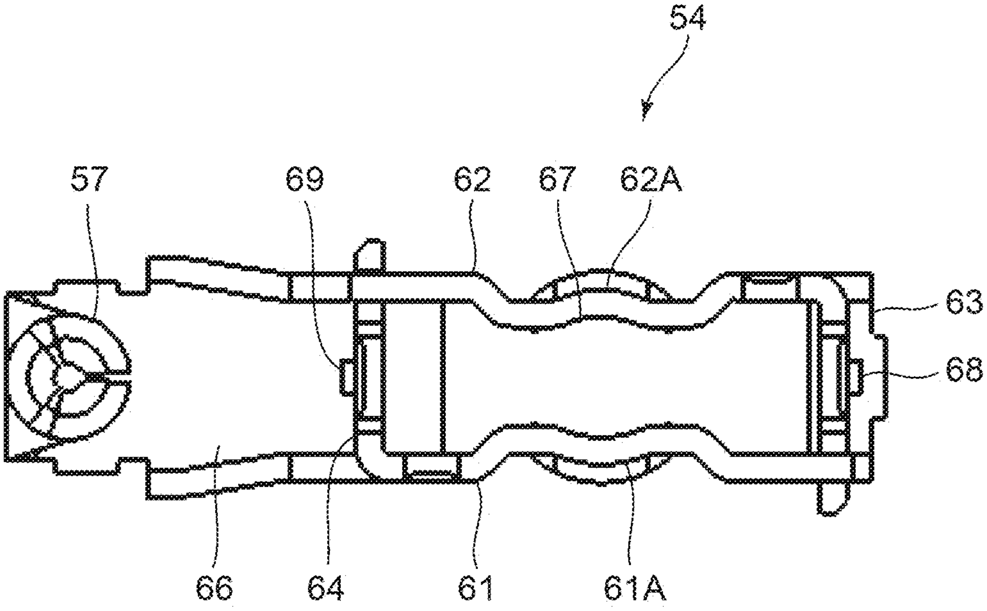
FIG. 8 is a plan view of the connection terminal of FIG. 5.
Figure 9:
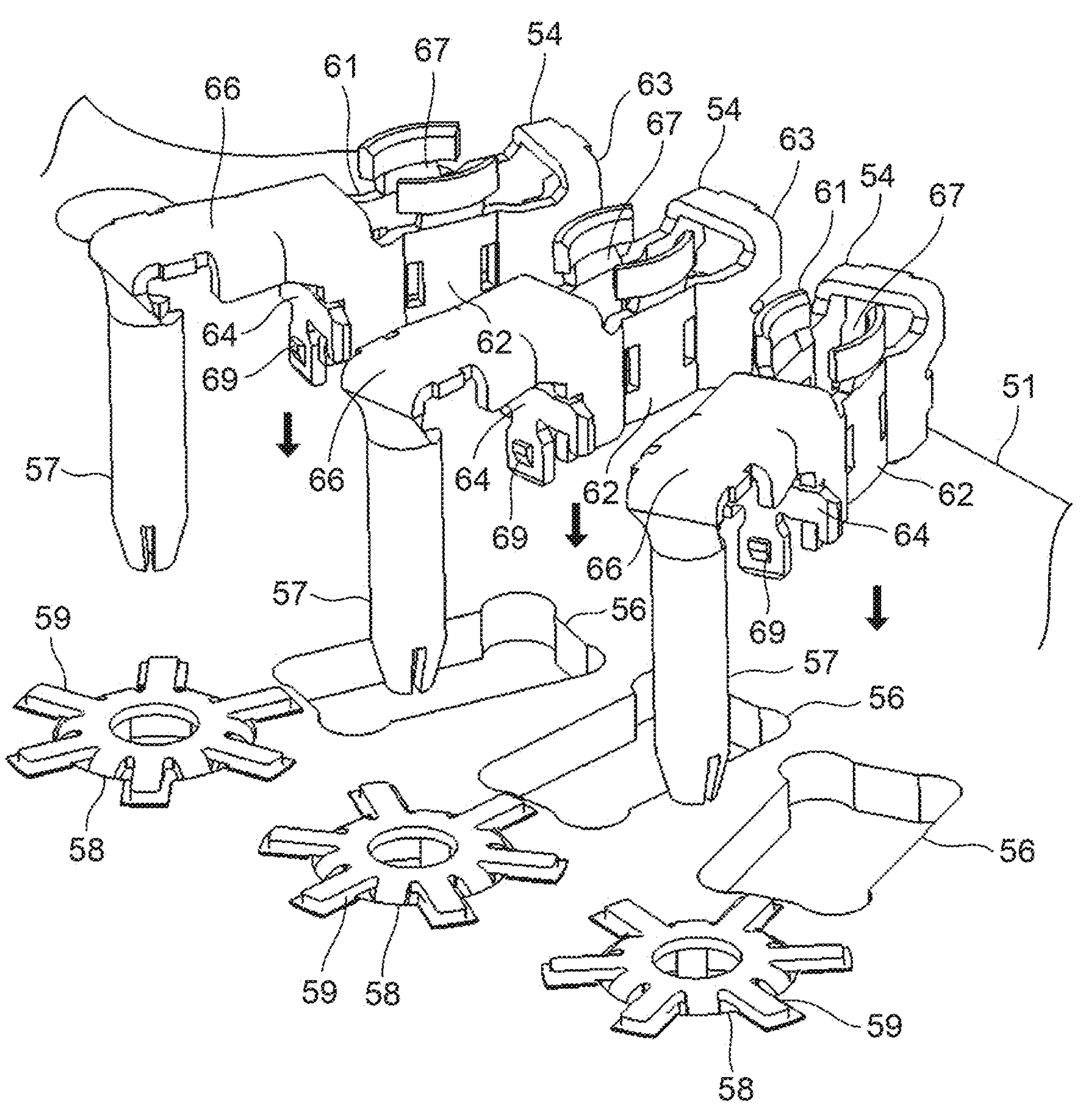
FIG. 9 is a view illustrating a procedure for attaching each connection terminal to the circuit board of the electric compressor of FIG. 1.
Figure 10:
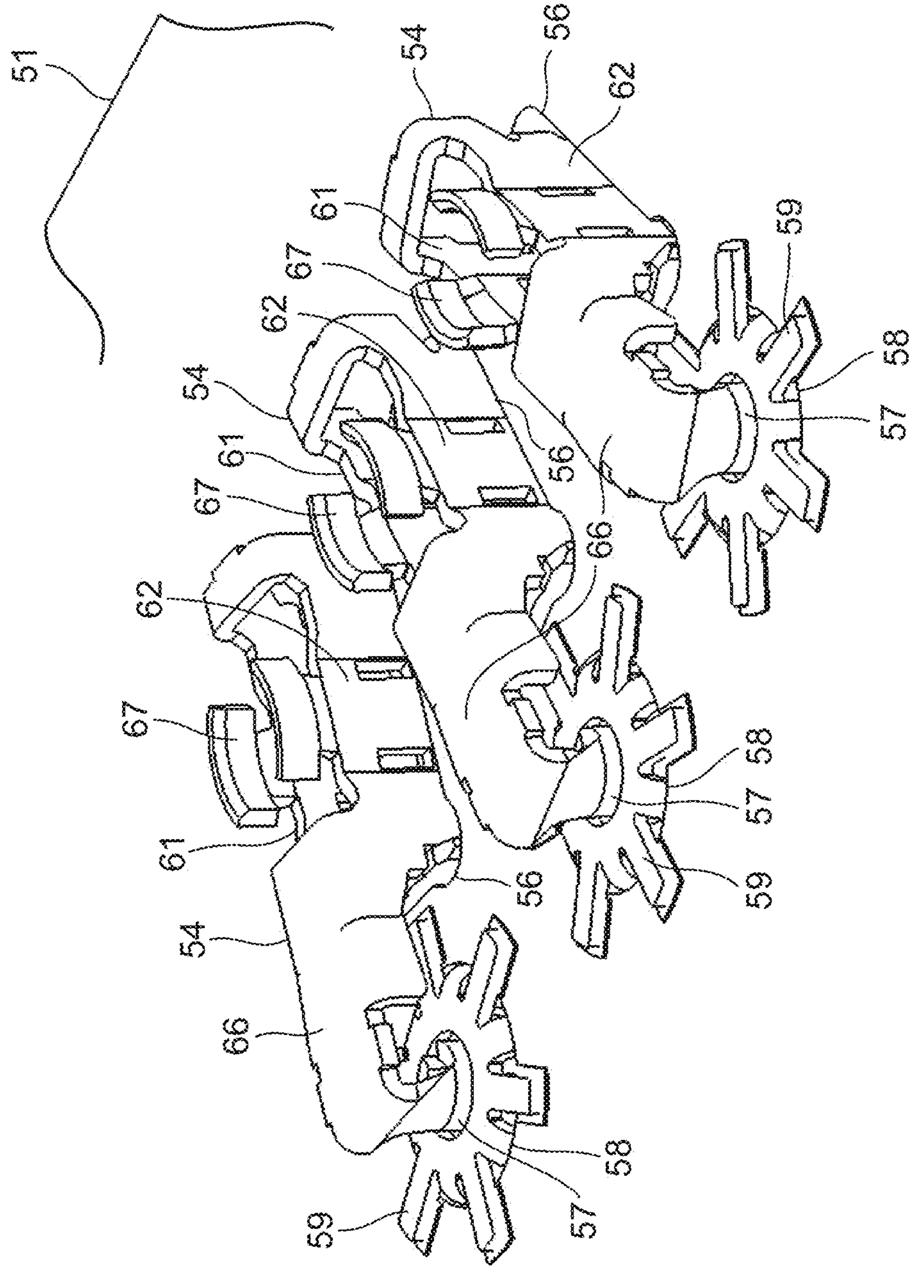
FIG. 10 is an enlarged perspective view of the electric compressor of FIG. 1 in a state in which each connection terminal is attached to the circuit board.

Further, the engagement claws 68 and 69 of the connecting walls 63 and 64 of each connection terminal 54 engage with a longitudinal edge of the through hole 56 (FIG. 3). In this state, each connection terminal 54 is held on the circuit board 51 (FIG. 10). At this time, since the width of the connection terminal 54 in its lateral direction is set to be smaller than the width of the through hole 56 of the circuit board 51 in its lateral direction, the connection terminal 54 becomes movable within the range indicated by a solid line arrow in FIG. 3 in the planar direction of the circuit board 51.

Figure 11:
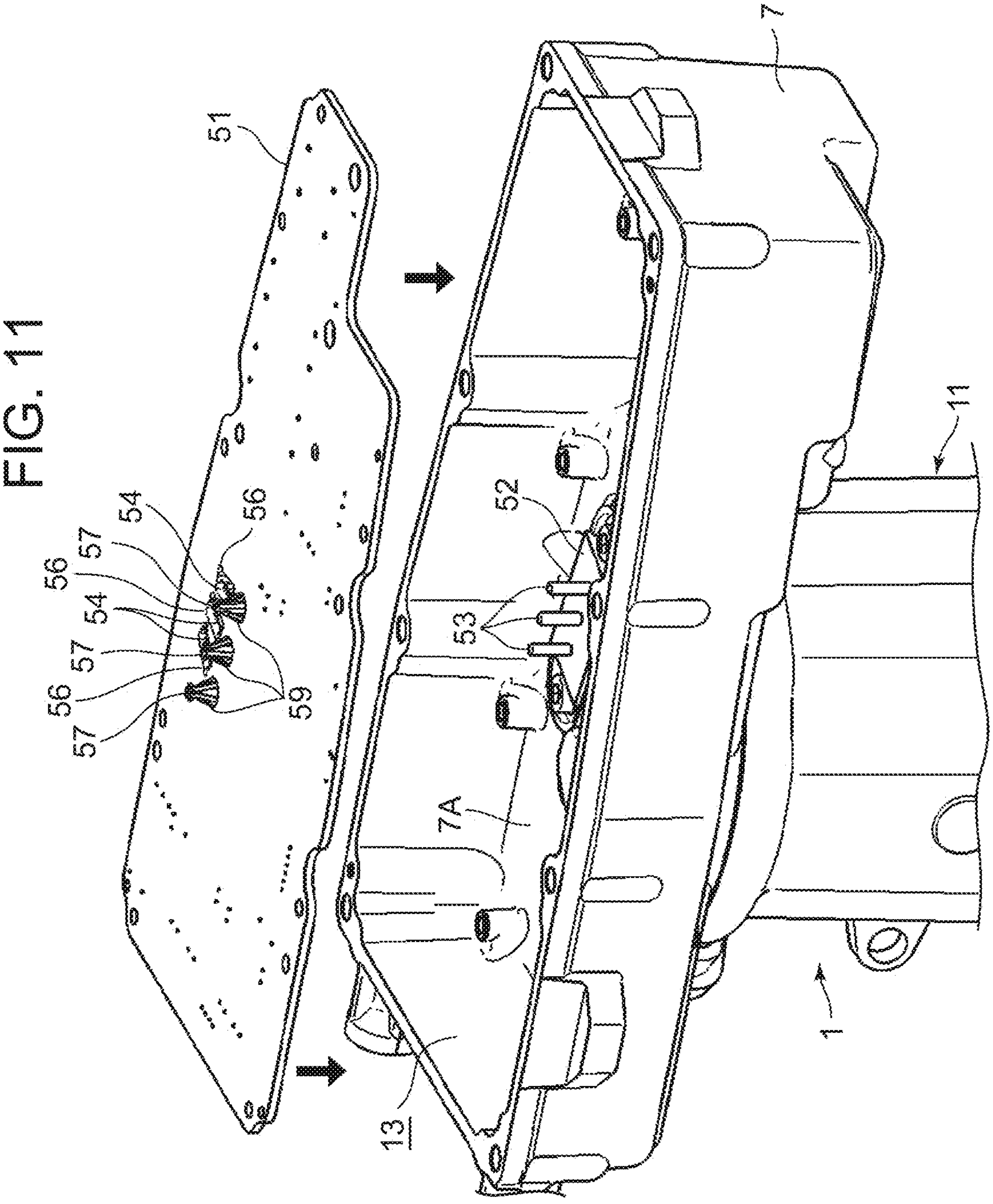
FIG. 11 is a view illustrating a procedure for assembling the circuit board of the electric compressor of FIG. 1 into the inverter accommodation part.
Figure 12:
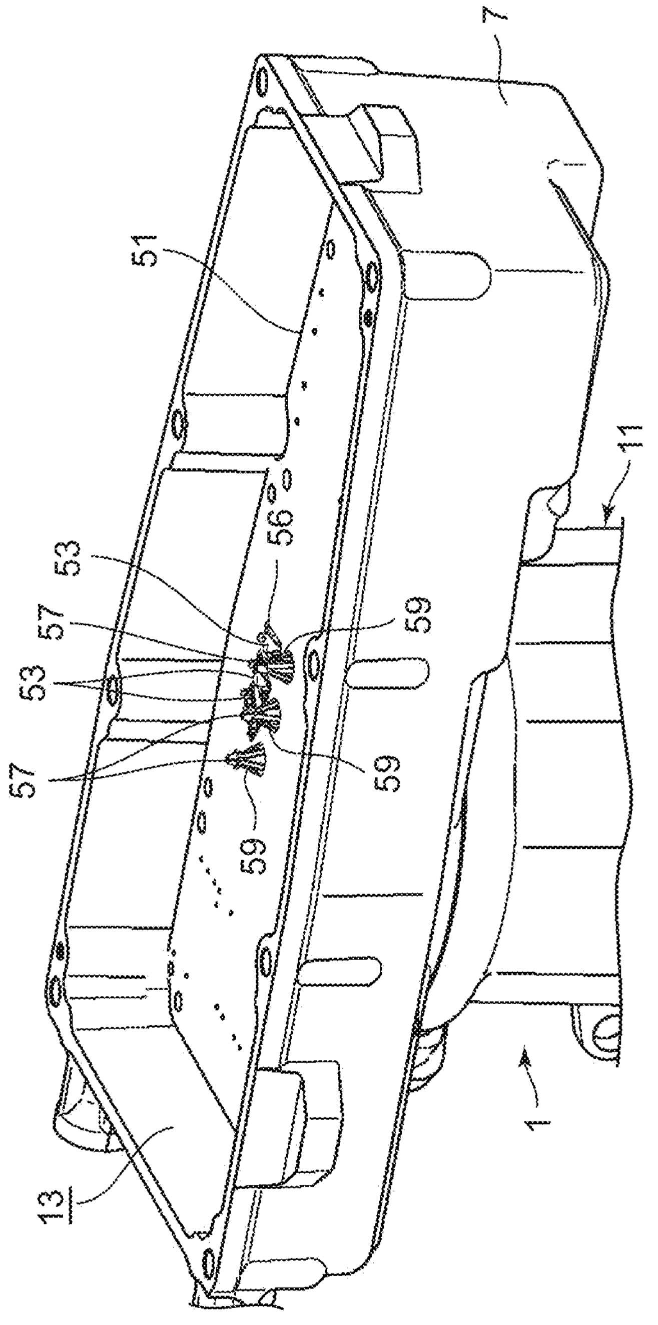
FIG. 12 is a perspective view of a part for the inverter accommodation part in a state in which the circuit board of the electric compressor of FIG. 1 is attached thereto.

With the three connection terminals 54 attached and held in the through holes 56 respectively in this way, the circuit board 51 is held in the inverter accommodation part 13 by an automatic machine with the back surface (the back surface of the circuit board 51) as the housing 11 side as indicated by arrows in FIG. 11, and is fixed to the housing 11 (stator housing 7) with bolts not illustrated in the figure (FIG. 12).

In the process of inserting the circuit board 51 into the inverter accommodation part 13, each hermetic pin 53 enters and fits into the fitting portion 67 of each connection terminal 54 (FIG. 3). In this way, each hermetic pin 53 enters into the through hole 56 and is simultaneously fitted and connected to each connection terminal 54, so that the hermetic pin 53 and the circuit board 51 are electrically connected via the connection terminal 54.

At this time, since the fitting portion 67 of the connection terminal 54 is configured by the arcuate portions 61A and 62A each having the elliptical arc shape long in the longitudinal direction of the connection terminal 54, the fitted state between the connection terminal 54 and the hermetic pin 53 is maintained even if the position of the connection terminal 54 with respect to the hermetic pin 53 changes in its longitudinal direction (in the direction of a white arrow in FIG. 3). That is, the change in the position of the connection terminal 54 with respect to the hermetic pin 53 is allowed within the range of the long arc of the fitting portion 67.

Thus, even if there are variations in the shapes, dimensions, and mounting positions of the circuit board 51 and the connection terminal 54, the variations in the longitudinal direction of each connection terminal 54 are absorbed within the range of the arc of the fitting portion 67, and the variations in the lateral direction thereof are absorbed by the connection terminal 54 rotating around the board connection pin 57 within the range indicated by solid line arrows in FIG. 3.

Further, as described above, the interval between the insertion holes 58 is set to be larger than the interval between the ends of the through holes 56 on the opposite sides from the insertion holes 58. Therefore, the interval between the board connection pins 57 becomes larger than the interval between the hermetic pins 53 in a state in which the circuit board 51 is connected to the hermetic pin 53 by the connection terminal 54 (FIG. 2). Consequently, the insulation distance between the board connection pins 57 (the insulation distance between the connection terminals 54 on the circuit board 51 side) is ensured.

As described above, in the present invention, the through holes 56 into which the connection terminals 57 and the hermetic pins 53 enter are formed in the circuit board 51, so that interference between the circuit board 51 and the hermetic pins 53 and the connection terminals 54 in the height direction (the height direction of the inverter accommodation part 13) is avoided. Consequently, the height of the circuit board 51 from the partition wall 7A can be made low, and the size and weight of the electric compressor 1 can be reduced by reducing the height dimension of the inverter accommodation part 13.

Also, the cracking of the hermetic plate 52 due to the variations during assembly can also be avoided, and the hermetic plate 52 can be shared between different models. It is also possible to reduce the cost and development time.

Further, in the embodiment, since each connection terminal 54 is held on the circuit board 51 while entering the through hole 56, a special part holding the connection terminal 54 can be omitted, and hence the number of parts can be reduced. Further, since the connection terminal 54 is made movable in the planar direction of the circuit board 51 while being held on the circuit board 51, it is possible to absorb the variations in the position of the connection terminal 54 relative to each hermetic pin 53 during assembly and to realize smooth assembly by the automatic machine.

Further, in the embodiment, the connection terminal 54 is provided with the board connection pin 57 for connecting to the circuit board 51 and the fitting portion 67 for connecting to the hermetic pin 53. The fitting portion 67 is configured to have the shape which allows the position of the connection terminal 54 relative to the hermetic pin 53 to change. The circuit board 51 is formed with the insertion hole 58 through which the board connection pin 57 is inserted. The power basket 59 to which the board connection pin 57 is connected is provided in the insertion hole 58. Therefore, it is possible to more excellently absorb the variations in the position of the connection terminal 54 relative to the hermetic pin 53 during assembly, and to realize stable electrical connections of the hermetic pin 53 and the circuit board 51 by the connection terminal 54 even by assembly with the automatic machine.

In addition, in the embodiment, the connection terminal 54 is movable in the planar direction of the circuit board 51. Therefore, for example, even when the position of the power basket 59 of the circuit board 51 differs depending on the model, the displacement in the position can be absorbed by moving the connection terminal 54, and the hermetic plate 52 can be made common among different models.

In this case, the hermetic pins 53 and the power baskets 59 are respectively provided three by three in the embodiment, corresponding to each phase of the electric motor 2, and the connection terminals 54 are also connected to the hermetic pins 53 respectively. However, in the embodiment, in the state in which the board connection pins 57 of the connection terminals 54 are connected to the power baskets 59 respectively, the interval between the board connection pins 57 is set to be larger than the interval between the hermetic pins 53. Therefore, it is possible to ensure the insulation distance between the connection terminals 54 on the circuit board 51 side and to handle even an ultra-high voltage.

Further, in the embodiment, since the fitting portion 67 of the connection terminal 54 is made fittable to the hermetic pin 53 in the state in which the connection terminal 54 is held in the through hole 56 of the circuit board 51 and the board connection pin 57 is connected to the power basket 59, it is possible to achieve a reduction in the number of personnel by assembly with the automatic machine.

Note that it goes without saying that the specific shapes of the connection terminals and the like illustrated in the embodiment are not limited to those in the embodiment, and can be altered without deviating from the gist of the present invention.

DESCRIPTION OF REFERENCE NUMERALS

1 inverter-integrated electric compressor
2 electric motor (motor)
3 inverter
4 scroll compression mechanism (compression mechanism)
7 stator housing
7A partition wall
8 cover
11 housing
12 motor chamber
13 inverter accommodation part
51 circuit board
52 hermetic plate
53 hermetic pin
54 connection terminal
56 through hole
57 board connection pin
58 insertion hole
59 power basket
67 fitting portion
68, 69 engagement claw

The invention claimed is:

1. An inverter-integrated electric compressor comprising:
a motor chamber in which a motor is built;
an inverter accommodation part to which an inverter supplying power to the motor is attached; and
a hermetic plate provided on a partition wall between the motor chamber and the inverter accommodation part, wherein
a hermetic pin of the hermetic plate and a circuit board of the inverter are connected via a connection terminal, and
the inverter-integrated electric compressor includes a through hole formed in the circuit board and into which the connection terminal and the hermetic pin enter,
wherein the connection terminal has a board connection pin for connecting to the circuit board and a fitting portion for connecting to the hermetic pin, and the fitting portion has a shape which allows a change in the position of the connection terminal with respect to the hermetic pin, wherein the connection terminal is held on the circuit board in a state in which the connection terminal enters the through hole, and in that state, the connection terminal is movable in a planar direction of the circuit board, and
wherein the circuit board is formed with an insertion hole into which the board connection pin is inserted, and the insertion hole is provided with a power basket to which the board connection pin is connected.

2. The inverter-integrated electric compressor according to claim 1, wherein
a plurality of the hermetic pins and the power baskets are provided corresponding to each phase of the motor, and the connection terminal is connected to each of the hermetic pins, and
in a state in which the board connection pins of the connection terminals are connected to the power baskets respectively, an interval between the board connection pins becomes larger than an interval between the hermetic pins.

3. The inverter-integrated electric compressor according to claim 1, wherein the fitting portion of the connection terminal is fittable to the hermetic pin in a state in which the connection terminal is held in the through hole of the circuit board, and the board connection pin is connected to the power basket.

* * * * *